United States Patent
Sun et al.

(10) Patent No.: US 7,593,788 B2
(45) Date of Patent: Sep. 22, 2009

(54) AUTOMATED CONTROL STRATEGY FOR FUEL PROCESSOR REACTOR SHIFT CATALYST REGENERATION

(75) Inventors: Hongqiao Sun, Sugar Land, TX (US); Daniel G. Casey, Kingwood, TX (US); Vesna R. Mirkovic, Pearland, TX (US); Bhaskar Balasubramanian, Houston, TX (US); W. Spencer Wheat, Missouri City, TX (US); Curtis L. Krause, Houston, TX (US)

(73) Assignee: Texaco Inc., San Ramon, CA (US)

( * ) Notice: Subject to any disclaimer, the term of this patent is extended or adjusted under 35 U.S.C. 154(b) by 958 days.

(21) Appl. No.: 11/016,676

(22) Filed: Dec. 17, 2004

(65) Prior Publication Data
US 2005/0143862 A1  Jun. 30, 2005

Related U.S. Application Data

(63) Continuation-in-part of application No. 10/407,488, filed on Apr. 4, 2003, now Pat. No. 7,318,970.

(51) Int. Cl.
G05B 21/00 (2006.01)
C10J 3/46 (2006.01)
G01N 35/08 (2006.01)

(52) U.S. Cl. .................. 700/266; 700/268; 700/272; 700/274; 48/197 R; 436/43; 436/50; 436/55

(58) Field of Classification Search .................. None
See application file for complete search history.

(56) References Cited

U.S. PATENT DOCUMENTS 4,673,624 A  6/1987  Hockaday
5,731,101 A  3/1998  Sherif et al.

(Continued)

FOREIGN PATENT DOCUMENTS

EP  1160193  12/2001

(Continued)

OTHER PUBLICATIONS

Bonhôte, et al.. "Hydrophobic, Highly Conductive Ambient-Temperature Molten Salts," Inorg. Chem. 35.1168-1178 (1996).

(Continued)

Primary Examiner—Jill Warden
Assistant Examiner—Neil Turk
(74) Attorney, Agent, or Firm—Melissa Patangia; Frank C. Turner; Williams Morgan & Amerson, PC

(57) ABSTRACT

A method and apparatus for use in regenerating a reactor shift bed catalyst are disclosed. The method comprises monitoring the saturation level of a reactor shift bed catalyst in a reformer; automatically detecting that the reactor shift bed catalyst has entered a saturated state; and automatically regenerating the reactor shift bed catalyst in response to automatically detecting the saturated state. The apparatus may be, in various aspects, a program storage method encoded with instructions that, when executed by a computing device, performs such a method; a computing apparatus programmed to perform such a method, or a control system performing such a method.

7 Claims, 8 Drawing Sheets

U.S. PATENT DOCUMENTS

| | | | |
|---|---|---|---|
| 5,827,602 A | 10/1998 | Koch et al. | |
| 6,269,286 B1 | 7/2001 | Tse et al. | |
| 6,682,838 B2 | 1/2004 | Stevens | |
| 6,824,577 B2 | 11/2004 | Deshpande | |
| 6,972,119 B2 * | 12/2005 | Taguchi et al. | 422/188 |
| 7,135,050 B2 | 11/2006 | Asou et al. | |
| 2002/0031692 A1 | 3/2002 | Fuglevand et al. | |
| 2002/0083646 A1 | 7/2002 | Deshpande et al. | |
| 2002/0088740 A1 | 7/2002 | Krause et al. | |
| 2002/0090326 A1 | 7/2002 | Deshpande | |
| 2002/0090327 A1 | 7/2002 | Deshpande | |
| 2002/0090334 A1 | 7/2002 | Stevens et al. | |
| 2002/0094310 A1 | 7/2002 | Krause et al. | |
| 2002/0098129 A1 | 7/2002 | Martin et al. | |
| 2003/0070361 A1 * | 4/2003 | Gubner | 48/61 |
| 2004/0197615 A1 | 10/2004 | Mirkovic et al. | |

FOREIGN PATENT DOCUMENTS

EP        1211394 A2      6/2002

OTHER PUBLICATIONS

Bowlas, et al., "Liquid-crystalline ionic liquids," *Chem Commun.* 1625-1626 (1996).

Fannin, Jr., et al., "Properties of 1,3-Dialkylimidazolium Chloride—Aluminum Chloride Ionic Liquids. 2. Phase Transitions, Densities, Electrical Conductivities, and Viscosities," *J. Phys. Chem.* 88:2614-2621 (1984).

Fuller, et al., "Structure of 1-Ethyl-3-methylimidazolium Hexafluorophosphate: Model for Room Temperature Molten Salts," *J. Chem. Soc., Chem. Commun.* 299-300 (1994).

Suarez, et al., "Synthesis and physical-chemical properties of ionic liquids based on 1-n-butyl-3-methylimidazolium cation," J. Chim. Phys. 95:1626-1639 (1998).

Wilkes, et al., "Air and Water Stable 1-Ethyl-3-methylimidazolium Based Ionic Liquids," *J. Chem. Soc., Chem. Commun.* 965-967 (1992).

* cited by examiner

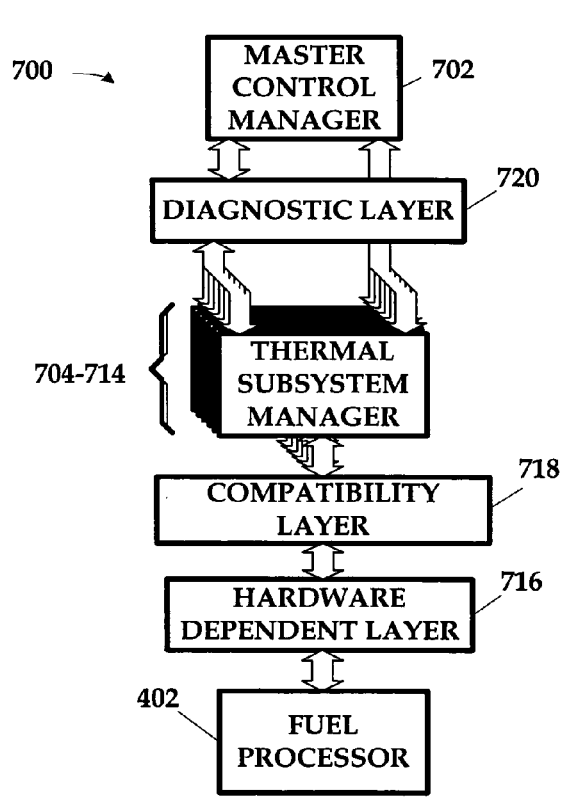
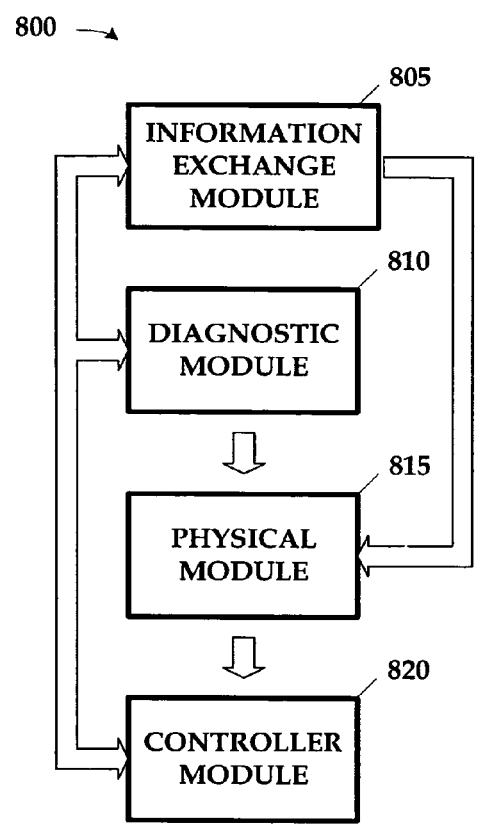
FIG. 7
FIG. 8

AUTOMATED CONTROL STRATEGY FOR FUEL PROCESSOR REACTOR SHIFT CATALYST REGENERATION

This is a continuation-in-part of co-pending U.S. application Ser. No. 10/407,488, entitled "Architectural Hierarchy of Control for a Fuel Processor," filed Apr. 19, 2003, in the name of the inventors Vesna R. Mirkovic et al., and commonly assigned herewith.

BACKGROUND OF THE INVENTION

1. Field of the Invention

The present invention is directed to a fuel processor, and, more particularly, to a control system for use in a fuel processor.

2. Description of the Related Art

There are numerous uses for pure hydrogen or hydrogen-enriched gas streams. For instance, fuel cells—a promising alternative energy source—typically employ hydrogen as a fuel for generating power. Many industrial processes also employ hydrogen or hydrogen-enriched gas streams in a variety of fields for the manufacture and production of a wide assortment of end products. However, pure hydrogen is not available as a natural resource in a form that can be readily exploited. As an example, natural gas, a hydrocarbon-based fuel, is frequently found in large subterranean deposits that can be easily accessed and transported once tapped. Nature does not provide such deposits of hydrogen.

One way to overcome this difficulty is the use of "fuel processors" or "reformers" to convert hydrocarbon-based fuels to a hydrogen rich gas stream which can be used as a feed for fuel cells. Hydrocarbon-based fuels, such as natural gas, liquid petroleum gas ("LPG"), gasoline, and diesel, require conversion for use as fuel for most fuel cells. Current art uses multi-step processes combining an initial conversion process with several clean-up processes. The initial process is most often steam reforming ("SR"), autothermal reforming ("ATR"), catalytic partial oxidation ("CPOX"), or non-catalytic partial oxidation ("POX"). The clean-up processes are usually comprised of a combination of desulfurization, high temperature water-gas shift, low temperature water-gas shift, selective CO oxidation, or selective CO methanation. Alternative processes include hydrogen selective membrane reactors and filters.

More particularly, the ATR performs a water-gas shift reaction that reduces CO concentration and increases $H_2$ production rate. This reaction is exothermal and sensitive to the temperature. Shift reaction temperature control is therefore a significant element for continuously making stable, low CO concentration and high $H_2$ yield reformate. And, better temperature control provides a more consistent, higher quality end product.

The ATR performs the water-gas shift reaction in what is called a "shift bed." The water gas shift reaction, which reduces CO concentration and increases $H_2$ production rate. This reaction is exothermal and sensitive to the temperature, therefore preheating and water cooling are used to maintain the temperature of the shift bed within an optimum reaction temperature range. As a result, condensation sometimes occurs on the shift catalyst of the shift bed, thus decreasing its level of activity with time. This decreasing level of activity negatively impacts the performance of the ATR.

The shift bed is therefore periodically subjected to a process called "regeneration" to revitalize the shift bed. Regeneration re-activates the catalyst to its starting level of performance. Careful control of temperature across the catalyst bed during the regeneration is necessary yet difficult to control. The temperature is also controlled to prevent damage to other types of catalysts found in the ATR such as ZnO, POx and ATR. Currently, this control is implemented manually. The task is tedious and arduous, and is compounded by the relatively long time that the process takes to complete.

The present invention is directed to resolving, or at least reducing, one or all of the problems mentioned above.

SUMMARY OF THE INVENTION

The invention includes, in its various aspects and embodiments, a method and apparatus for use in regenerating a reactor shift bed catalyst. In a first aspect, a method comprises monitoring the saturation level of a reactor shift bed catalyst in a reformer; automatically detecting that the reactor shift bed catalyst has entered a saturated state; and automatically regenerating the reactor shift bed catalyst in response to automatically detecting the saturated state. In a second aspect, a method comprises preparing the reformer for the automatic regeneration; purging the prepared reformer; heating a shift bed of the purged reformer; heating a preferential oxidizer of the purged reformer; actively controlling parameters of the regeneration; and resetting the reformer upon completing the regeneration. The apparatus may be, in various aspects, a program storage method encoded with instructions that, when executed by a computing device, performs such a method; a computing apparatus programmed to perform such a method, or a control system performing such a method.

BRIEF DESCRIPTION OF THE DRAWINGS

The invention may be understood by reference to the following description taken in conjunction with the accompanying drawings, in which like reference numerals identify like elements, and in which:

FIG. 7 depicts one particular embodiment of the automated control system of FIG. 4 for use in controlling the fuel processor first shown in FIG. 3;

FIG. 8 illustrates an architectural hierarchy of a subsystem manager for the control system first shown in FIG. 7;

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The present invention is generally directed to method and apparatus for controlling the reaction temperature of a "fuel processor," or "reformer," i.e., an apparatus for converting hydrocarbon fuel into a hydrogen rich gas. The term "fuel processor" shall be used herein. In the embodiment illustrated herein, the method and apparatus control a compact processor for producing a hydrogen rich gas stream from a hydrocarbon fuel. However, other fuel processors may be used in alternative embodiments. Furthermore, many possible uses are contemplated for the apparatus and method described herein, including any use wherein a hydrogen rich stream is desired. The method and apparatus may also be used in embodiments not applicable to the production of gas streams.

Figure 1:
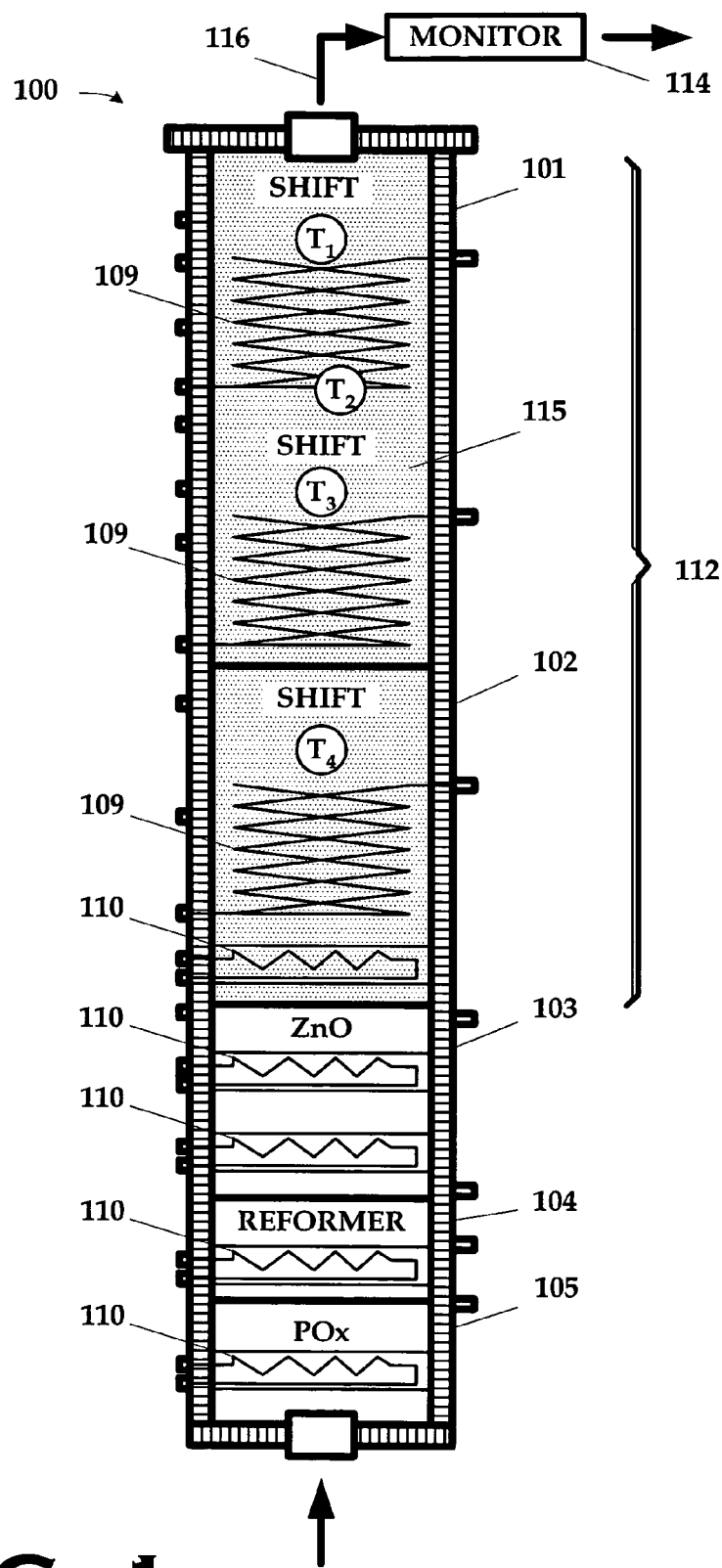
FIG. 1 presents one particular embodiment of an apparatus assembled and operated in accordance with one aspect of the present invention.

FIG. 1 conceptually depicts one particular implementation of an autothermal reformer ("ATR") 100. The ATR 100 may be implemented with any suitable design known to the art. The ATR 100 comprises several stages 101-105, including several heat exchangers 109 and electric heaters 110. The reformer shift bed 112, i.e., the sections 101-102, is functioning to perform a water gas shift reaction that reduces CO concentration and increases $H_2$ production rate. The reformer shift bed 112 comprises, among other things, a catalyst 115. Those in the art having the benefit of this disclosure will appreciate that this figure is simplified by the omission of some elements not material to the practice of the invention in this particular embodiment. For example, the heat exchangers mentioned above and various inputs and outputs to the sections 103-105 have been omitted for the sake of clarity and so as not to obscure the present invention.

The shift bed 112 also includes a plurality of sensors $T_1$-$T_4$ disposed therein. The precise number of temperature sensors $T_x$ is not material to the practice of the invention, although a greater number will typically provide a finer degree of control. In the illustrated embodiment, the temperature sensors $T_1$-$T_4$ are thermocouples, but other types of temperature sensor may be used in alternative embodiments. The automated control system 106 used the temperature sensors $T_1$-$T_4$ to monitor actual temperatures at various locations within the shift bed 112. Temperature detection points are selected based upon the structure of the cooling/heating system and should be selected so that the measured temperatures reflect true reaction temperatures rather than localized temperatures adjacent the heat exchange coils 109. The ATR 100 also has associated therewith a monitor 114. The monitor 114 monitors the composition of the output 116 of the ATR 100.

Preheating and water cooling maintain the temperature in the shift bed 112 within a desired reaction temperature range. In order to achieve this objective, in an enlarged shift reactor, multiple heat exchange coils 109 may provide localized temperature control. In the illustrated embodiment, the elongated shift bed 112 utilizes three different heat exchange coils 109 for controlling the temperature of the shift bed 112. The reaction temperature control strategy varies as a combination result of $H_2$ production rate, shift reaction stage, shift bed vertical temperature gradient and the temperature detecting points in a manner described more fully below.

Figure 2A:
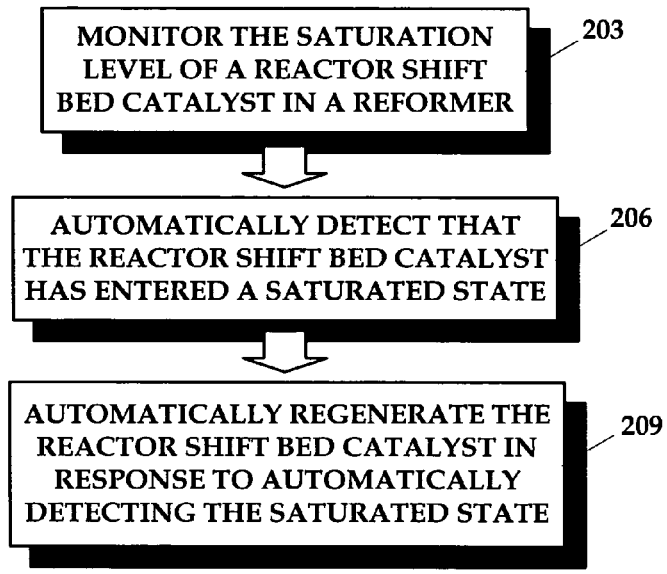
FIG. 2A and FIG. 2B illustrate particular embodiments of methods practiced in accordance with another aspect of the present invention.

FIG. 2A illustrates one particular embodiment of a method 200 practiced in accordance with another aspect of the present invention. The method 200 is disclosed in the context of the ATR 100 of FIG. 1. However, the method 200 may be employed with alternative reformers, and virtually any reformer having a reactor shift bed catalyst.

The method 200 begins by monitoring (at 203) the saturation level of a reactor shift bed catalyst 115 in a reformer, e.g., the ATR 100. The saturation level being monitored is the saturation of the shift bed catalyst 112 with condensation from the water-gas shift reaction performed in the ATR 100. The monitoring (at 203) includes sensing a plurality of conditions within the shift bed catalyst 112. For example, the temperatures $T_1$-$T_4$ may be monitored by heat sensors, such as thermocouples, placed in the shift bed 112 at points of interest if a constant level of cooling permitting temperature fluctuations is present in the shift bed 112. In general, in these situations, drops in reaction temperatures will indicate saturation. Or, the composition of the output by the ATR 100 may indicate saturation from elevations of CO (e.g. CO 4%) in the output. Typically, this monitoring (at 203) will be automated, or "automatic," i.e., under programmed control by a computer-implemented control system and without direct human intervention. One such embodiment of a control system capable of automatically monitoring the saturation of the reactor shift bed catalyst 115 is discussed further below.

The method 200 continues by automatically detecting (at 206) that the reactor shift bed catalyst 115 has entered a saturated state. Note that the term "saturated state" does not necessarily imply that the shift bed catalyst 115 is 100% saturated, although such would indeed constitute a saturated state. The term "saturated state" implies that the shift bed catalyst 115 has reach a saturation level at which it is desirable to regenerate it. What constitutes a saturated state in any given embodiment will be implementation specific. Factors such as the implementation of the shift bed catalyst, the throughput of the reformer, the starting fuel, the reformate specification, etc. Those of ordinary skill in the art having the benefit of this disclosure will be able to define a saturation state appropriate for any given implementation in the various alternative embodiments of the present invention.

Figure 2B:
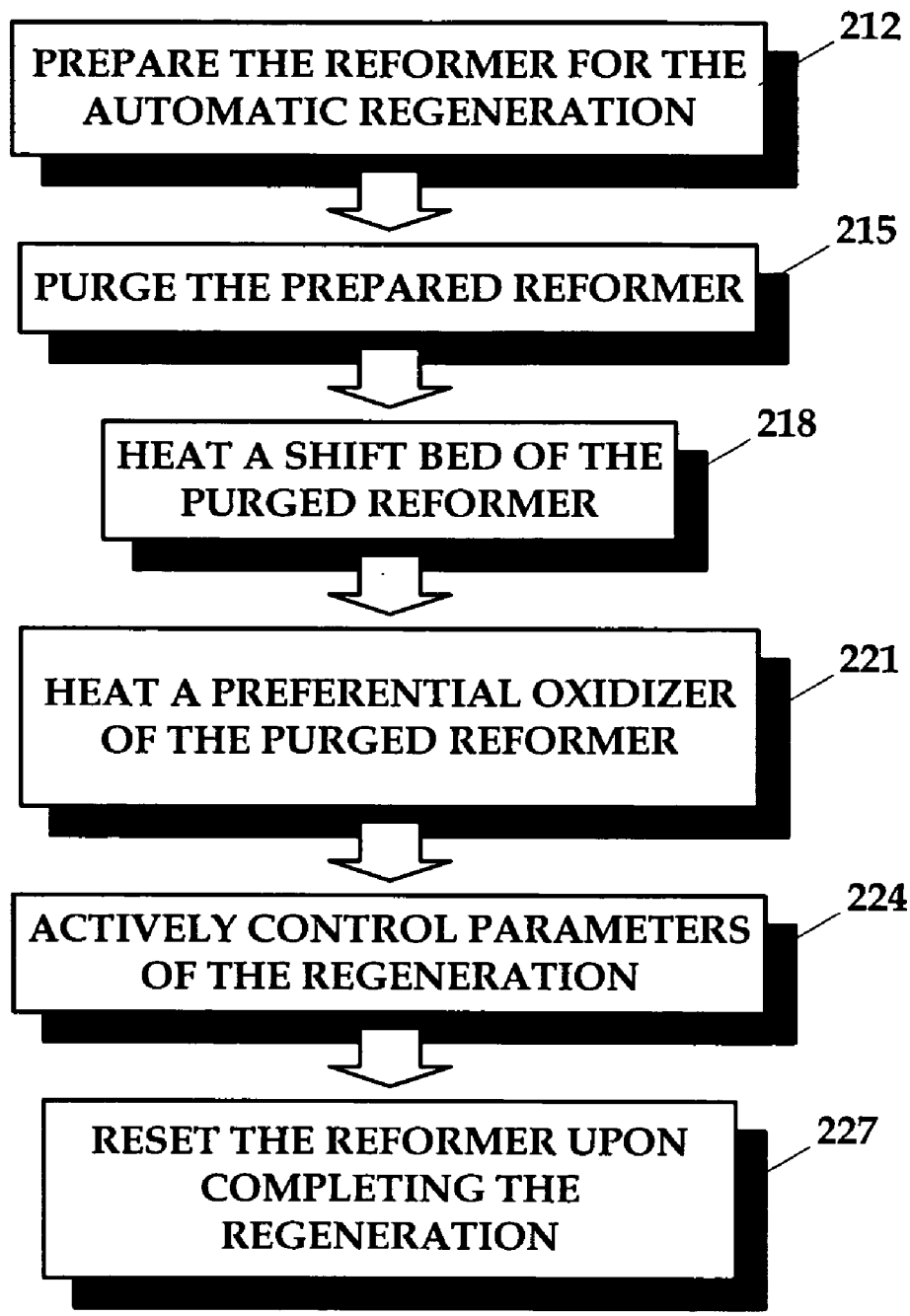

The method 200 then automatically regenerates (at 209) the reactor shift bed catalyst in response to automatically detecting (at 206) the saturated state. Again, the manner in which the reactor shift bed catalyst 115 is regenerated will be implementation specific. In the illustrated embodiment, the reactor shift bed catalyst 115 is regenerated through the method 209', shown in FIG. 2B. The method 209' first prepares (at 212) the reformer, i.e., the ATR 100, for the automatic regeneration. The method 209' then purges (at 215) the prepared reformer. The method 209' then heats (at 218) the shift bed 112 and (at 221) the preferential oxidizer 105 of the purged reformer. The method 209' proceeds by actively (at 224) controlling parameters of the regeneration. Eventually, the method 209' resets (at 227) the reformer upon completing the regeneration.

Figure 3A:
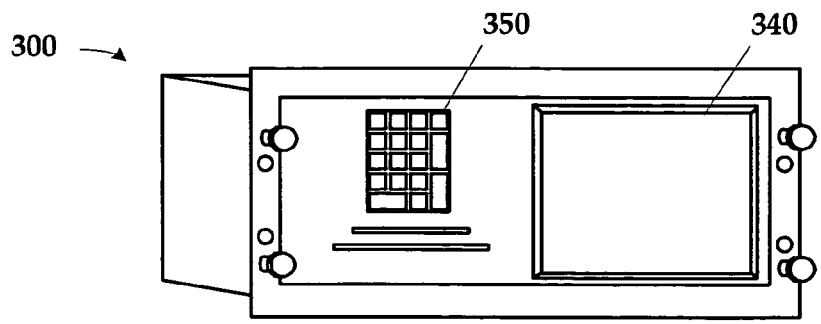
FIG. 3A and FIG. 3B conceptually illustrate a computing apparatus as may be used in the implementation of one particular embodiment of the present invention in a third aspect thereof.
Figure 3B:
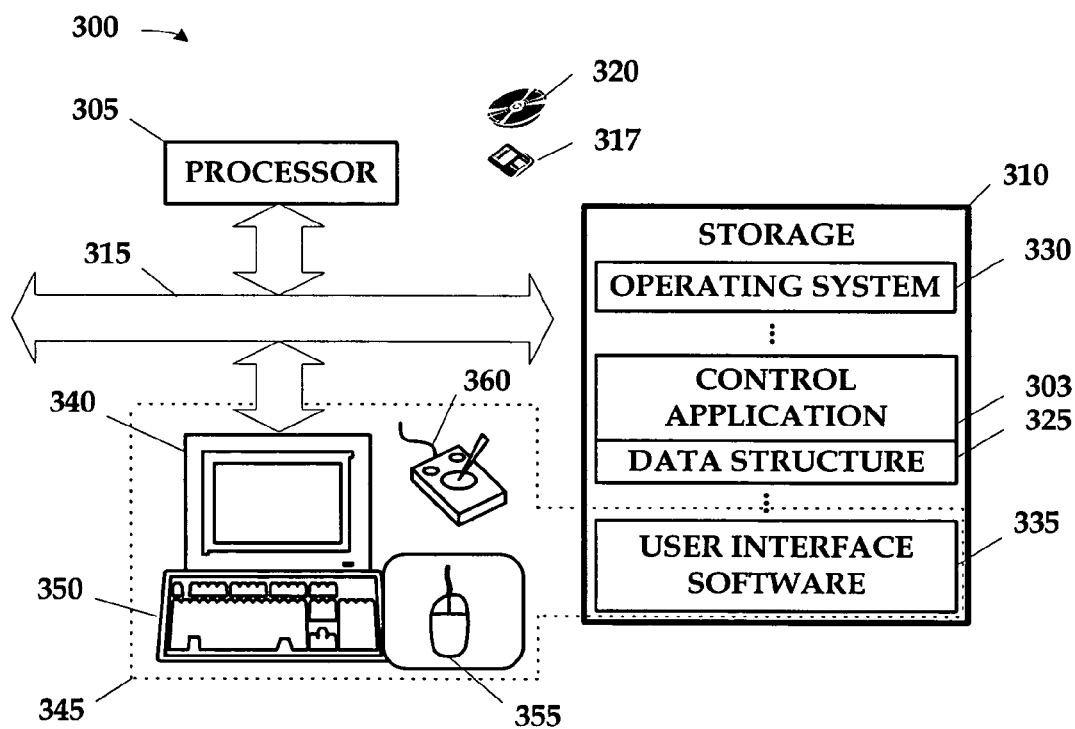

The method 200, shown in FIG. 2A is implemented as a part of an automated control system (not yet shown) in software residing on a computing apparatus 300, shown in FIG. 3A and FIG. 3B, in the form of a control application 303. The particular embodiment of the computing apparatus 300 illustrated in FIG. 3A and FIG. 3B is rack mounted although it need not be rack-mounted in all embodiments. Indeed, this aspect of any given implementation is not material to the practice of the invention. The computing apparatus 300 may be implemented as a desktop personal computer, a workstation, a notebook or laptop computer, an embedded processor, or the like.

The computing apparatus 300 illustrated in FIG. 3A and FIG. 3B includes a processor 305 communicating with a storage 310 over a bus system 315. The storage 310 may include a hard disk and/or random access memory ("RAM") and/or removable storage such as a floppy magnetic disk 317 and an optical disk 320. The storage 310 is encoded with a data structure 325 storing the data for use by the control application 303 in controlling the operation of the ATR 100 and associated equipment.

The computing apparatus also includes an operating system 330 and user interface software 335 encoded residing on the storage 310. The user interface software 335, in conjunction with a display 340, implements a user interface 345. The user interface 345 may include peripheral I/O devices such as a key pad or keyboard 350, a mouse 355, or a joystick 360. The processor 305 runs under the control of the operating system 330, which may be practically any operating system known to the art. The control application 303 is invoked by the operating system 330 upon power up, reset, or both, depending on the implementation of the operating system 330.

Thus, at least some aspects of the present invention will typically be implemented as software on an appropriately programmed computing device, e.g., the computing apparatus 300 in FIG. 3A and FIG. 3B. The instructions may be encoded on, for example, the storage 310, the floppy disk 317, and/or the optical disk 320. The present invention therefore includes, in one aspect, a computing apparatus programmed to perform the method of the invention. In another aspect, the invention includes a program storage device encoded with instructions that, when executed by a computing apparatus, perform the method of the invention.

Some portions of the detailed descriptions herein may consequently be presented in terms of a software-implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Figure 4:
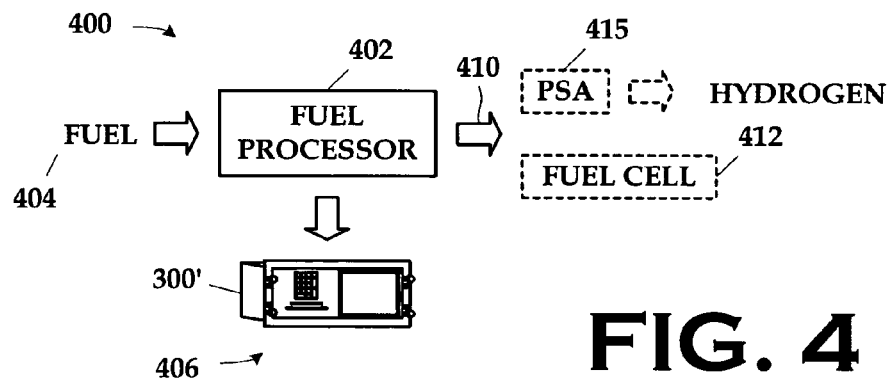
FIG. 4 presents one particular embodiment of an apparatus assembled and operated in accordance with the present invention.

To further an understanding of the present invention, one particular embodiment thereof will now be presented in greater detail. FIG. 4 illustrates an apparatus 400 including a fuel processor 402 fed a fuel 404 and operating under an automated control system 406, represented by a computing apparatus 300'. The fuel processor 402 reforms the fuel 404 to produce a reformate 410. The automated control system 406 controls the process by which the fuel processor 402 reforms the fuel 404 into the reformate 410. The design of the fuel processor 402, and the reforming process, will depend to a large degree on the fuel 404 input to the fuel processor 402 and the end use to which the reformate 410 will be put.

The fuel processor 402 may be a self-contained auto-thermal reforming ("ATR") fuel processor that converts pipeline-quality natural gas to fuel cell grade fuel. Thus, the apparatus 400 may be a natural gas power plant, although the invention may be practiced with alternative fuels and end applications. For instance, the reformate 410 may be output to a pressure swing absorber ("PSA") unit 415 for the production of a purified hydrogen, or a hydrogen enriched gas stream 412. Means other than a PSA may be utilized for purifying or concentrating hydrogen. The purified hydrogen 412 can then be stored and/or distributed to an end application such as powering a fuel cell 412, such as a conventional Proton Exchange Membrane Fuel Cell ("PEMFC"), also known as a Polymer Electrolyte Fuel Cell ("PEFC"), for example.

As previously mentioned, the fuel in the illustrated embodiment is natural gas, but may be some other type of hydrocarbon. The hydrocarbon fuel may be liquid or gas at ambient conditions as long as it can be vaporized. As used herein the term "hydrocarbon" includes organic compounds having C—H bonds which are capable of producing hydrogen from a partial oxidation or steam reforming reaction. The presence of atoms other than carbon and hydrogen in the molecular structure of the compound is not excluded. Thus, suitable fuels for use in the method and apparatus disclosed herein include, but are not limited to hydrocarbon fuels such as natural gas, methane, ethane, propane, butane, naphtha, gasoline, and diesel fuel, and alcohols such as methanol, ethanol, propanol, and the like.

The fuel processor 402 provides a hydrogen-rich effluent stream, or "reformate," as indicated by the graphic 410, to the fuel cell 412 or the PSA unit 415, for example. The reformate 410, in the illustrated embodiment, includes hydrogen and carbon dioxide and can also include some water, unconverted hydrocarbons, carbon monoxide, impurities (e.g., hydrogen sulfide and ammonia) and inert components (e.g., nitrogen and argon, especially if air was a component of the feed stream). Note, however, that the precise composition of the reformate 410 is implementation specific and not material to the practice of the invention.

Figure 5:
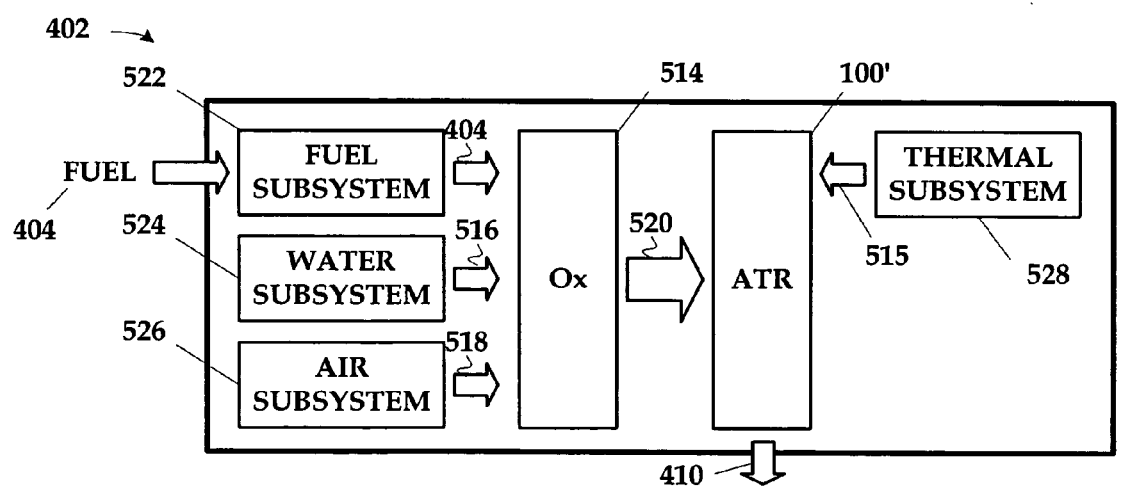
FIG. 5 illustrates one particular embodiment of the fuel processor of the apparatus in FIG. 4.

FIG. 5 illustrates one particular embodiment of the fuel processor 402 of the illustrated embodiment. The fuel processor 402 comprises several modular physical subsystems, namely:

an autothermal reformer ("ATR") 100' that performs a partial oxidation and optionally a steam reforming reaction to reform the fuel 404 into the reformate 410;

an oxidizer ("Ox") 514, which is an anode tailgas oxidizer ("ATO") in the illustrated embodiment, that preheats water 516, fuel 404, and air 518 for delivering a heated fuel mixture, or "process feed stream", 520 to the ATR 100';

a fuel subsystem 522, that delivers an input fuel 404 to the oxidizer 514 for preheating and inclusion in the process feed stream 520 delivered to the ATR 100';

a water subsystem 524, that delivers the water 516 to the oxidizer 514 for conversion to steam and inclusion in the process feed stream 520 delivered to the ATR 100';

an air subsystem 526, that delivers air 518 to the oxidizer 514 for mixing into the process feed stream 520 delivered to the ATR 100'; and a thermal subsystem 528, that controls temperatures in the operation of the ATR 100' by circulating a coolant 516 therethrough.

One particular embodiment of the ATR 100' is disclosed more fully below. The fuel subsystem 522, water subsystem 524, air subsystem 525, and thermal subsystem 528 may be implemented in any manner known to the art suitable for achieving the operational characteristics of the oxidizer 514 and ATR 100'.

The fuel subsystem 306 includes a fuel supply 402 and provides feeds to two different parts of the oxidizer 304. As previously mentioned, the fuel 305 in the illustrated embodiment is natural gas, but may be some other type of hydrocarbon. The reformate 410 exiting the fuel processor 402 is a hydrogen rich gas containing carbon dioxide and other constituents which may be present such as water, inert components (e.g., nitrogen, argon), residual hydrocarbon, etc. Product gas may be used as the feed 520 for a fuel cell or for other applications where a hydrogen rich feed stream is desired. Optionally, product gas may be sent on to further processing, for example, to remove the carbon dioxide, water or other components.

Table 1 presents additional information on the normal operation of the ATR 100' in the fuel processor 402. Note that the shift of the ATR 100' employs a non-pyrophoric shift catalyst, not shown. Non-pyrophoric shift catalysts are those that typically do not increase in temperature more than 200° C. when exposed to air after initial reduction. Non-pyrophoric shift catalysts may be based on precious metals, e.g., platinum or non-precious metals, e.g., copper. One commercially available non-pyrophoric shift catalyst suitable for use with the present invention is the SELECTRA SHIFT™ available from:

Engelhard Corporation
101 Wood Avenue
Iselin, N.J. 08830
(732)205-5000

However, other suitable non-pyrophoric shift catalysts may be used.

TABLE 1

Non-Pyrophoric Shift Catalyst Areas of Operation

| Reducing (Reformate) | Oxidizing (Air) |
| --- | --- |
| Maximum Temperature when operating <300° C. | No steam during oxidizing |
| Up to 350° C. for transients <30 minutes | H2O is reversible; 220° C. overnight; 400° C. in 1 hour |
| If over temperature, non-reversible, methenation begins | |
| No liquid water | No liquid water. |

Figure 6:
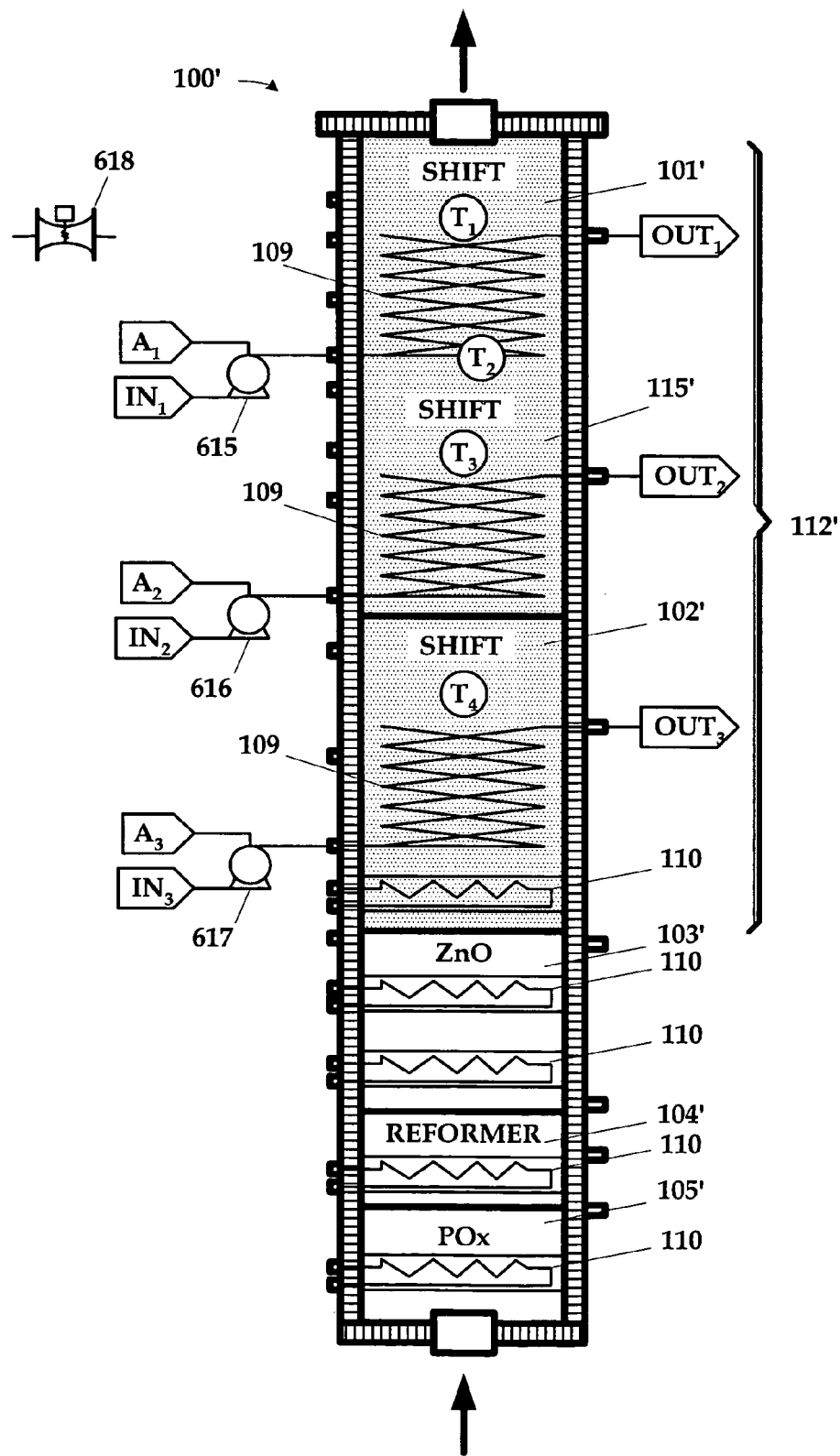
FIG. 6 details the reformer of the fuel processor in FIG. 5 and its operation.
Figure 10A:
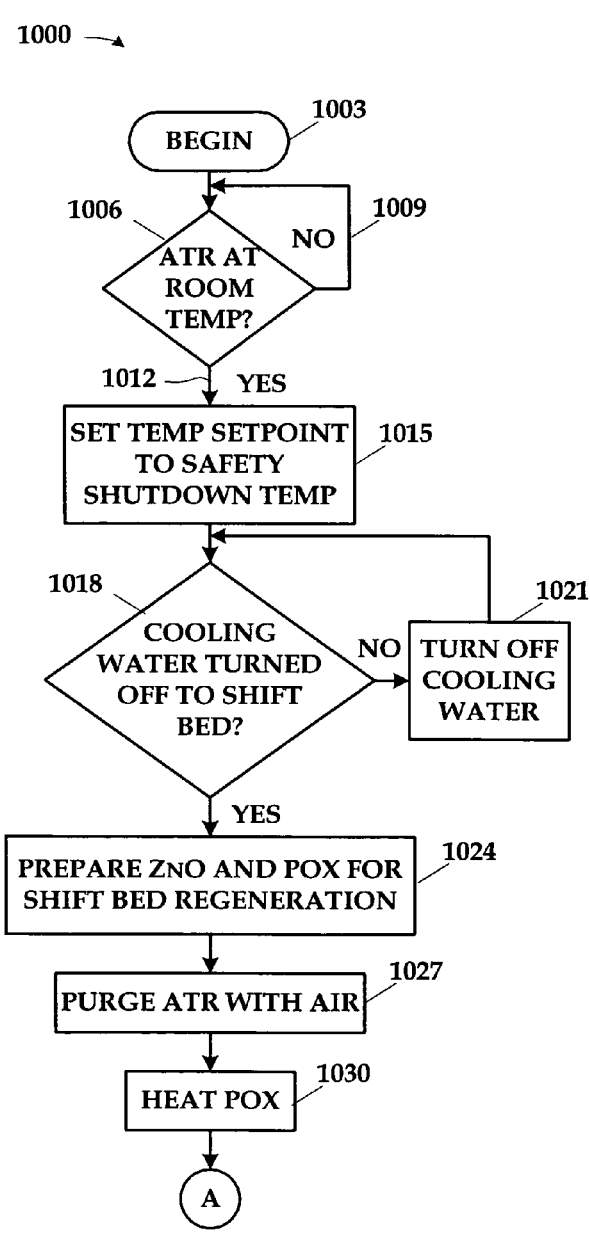
FIGS. 10A, 10B illustrate one particular embodiment of the method first illustrated in FIG. 2B.
Figure 10B:
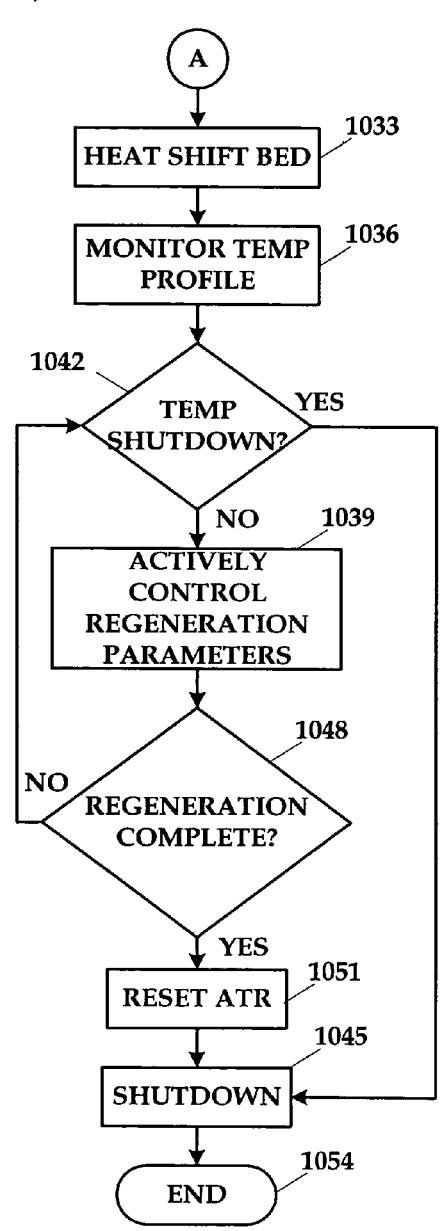

FIG. 6 conceptually depicts one particular implementation 100' of the ATR 100, shown in FIG. 1, as used in the apparatus 400 of FIG. 4. The ATR 100' may be implemented with any suitable design known to the art. The ATR 100' comprises several stages 101'-105', including several heat exchangers 109' and electric heaters (not shown). The reformer shift bed 112', i.e., the sections 101'-102', is functioning to perform the water gas shift reaction, discussed below relative to FIG. 10, which reduces CO concentration and increases $H_2$ production rate.

Each of the heat exchangers 109' receives temperature controlled coolant (not shown) from the thermal subsystem 528, shown in FIG. 5, over the lines $IN_1$-$IN_3$, respectively, and returns it over the lines $OUT_1$-$OUT_3$, respectively. The flow rate for the coolant in each line is controlled by a respective variable speed (i.e., positive displacement) pump 615-617. The pumps 615-617 are controlled by the automated control system 406, shown in FIG. 4, by signals received over the lines $A_1$-$A_3$, respectively. In alternative embodiments, a single pump may supply coolant under pressure over the lines $IN_1$-$IN_3$ and the flow rate may be controlled by flow control valves such as the flow control valve 618. Those in the art having the benefit of this disclosure will appreciate that this figure is simplified by the omission of some elements not material to the practice of the invention in this particular embodiment. For example, the heat exchangers mentioned above and various inputs and outputs to the sections 103'-105' have been omitted for the sake of clarity and so as not to obscure the present invention.

The shift bed 112' also includes a plurality of sensors $T_1$-$T_4$ disposed therein. The precise number of temperature sensors $T_x$ is not material to the practice of the invention, although a greater number will typically provide a finer degree of control. In the illustrated embodiment, the temperature sensors $T_1$-$T_4$ are thermocouples, but other types of temperature sensor may be used in alternative embodiments. The automated control system 406 used the temperature sensors $T_1$-$T_4$ to monitor actual temperatures at various locations within the shift bed 112'. Temperature detection points are selected based upon the structure of the cooling/heating system and should be selected so that the measured temperatures reflect true reaction temperatures rather than localized temperatures adjacent the heat exchange coils 109'.

Note that the temperature sensors $T_{1\ and\ T2}$ both measure temperature near the same heat exchanger 109' in a detail that is implementation specific. That particular heat exchanger 109' includes only a single coolant input $IN_1$. Most of the temperature sensors $T_1$-$T_4$ measure temperature downstream from a catalyst bed section containing a heat exchanger 109'. $T_1$ is supposed to read the temp immediately downstream from the uppermost catalyst bed (not shown). However, during installation and shipping the bed can shift and settle so that $T_1$ is measuring an air temperature rather than a bed or reaction temperature. Thus, a second sensor $T_2$ is added to monitor the upper section 101' of the ATR 100'. When $T_{1\ and\ T2}$ are sensing different temperatures, the control system 406 takes the higher of the two temperatures. Typically, there usually is only a minor difference between the two temperatures.

Preheating and water cooling maintain the temperature in the shift bed 112' within a desired reaction temperature range. In order to achieve this objective, in an enlarged shift reactor, multiple heat exchange coils 109' may provide localized temperature control. In the illustrated embodiment, the elongated shift bed 112' utilizes three different heat exchange coils 109' for controlling the temperature of the shift bed 112'. The reaction temperature control strategy varies as a combination result of $H_2$ production rate, shift reaction stage, shift bed vertical temperature gradient and the temperature detecting points in a manner described more fully below. A robust shift temperature control loop is developed for the reformer to generate stable and high quality H$_2$ product.

Returning now to FIG. 4, from a system level, the operation of the fuel processor 402 is automated under the aegis of the automated control system 406, whose structure 700 is illustrated in FIG. 7. Generally, the control system structure 700 comprises a number of modular "subsystem managers," one for each physical subsystem of the fuel processor 402. Referring now to both FIG. 5 and FIG. 7, each of the ATR 100', oxidizer 514, fuel subsystem 522, water subsystem 524, air subsystem 526, and thermal subsystem 512 constitutes a physical subsystem controlled by one of the subsystem managers 704-714. The actions of the subsystem managers 704-714 are coordinated by a master control manager 702, and the subsystem managers 704-714 communicate with the physical subsystems through a compatibility layer 718 and a hardware dependent layer 716. The illustrated embodiment also includes an option diagnostic layer 720, as is discussed further below.

Thus, more particularly, the control system structure 700 of the automated control system 406 comprises:
   a master control manager 702 that manages the control of the fuel processor 402 through the subsystem managers:
   a fuel subsystem manager 704 that controls the delivery of fuel 404 to the oxidizer 514 for mixing into the process feed stream 520 delivered to the ATR 100';
   a water subsystem manager 706 that controls delivery of water 516 to the oxidizer 514 for mixing into the process feed stream 520 delivered to the ATR 100';
   an air subsystem manager 708 that controls delivery of air 518 to the oxidizer 514 for mixing into the process feed stream 520 delivered to the ATR 100';
   an ATO subsystem manager 710 that controls the mixing of steam, fuel 404, and air 518 to create a fuel mixture delivered as a process feed stream 520 to the ATR 100';
   an ATR subsystem manager 712 that controls the oxidation-reduction reaction in the ATR 100' that reforms the fuel 404 input to the fuel processor 402 into a reformate 410 and controls the shift bed 112 and the water-gas shift reaction in the ATR 100'; and
   a thermal subsystem manager 714 controls temperatures in the operation of the ATR 100' through the thermal subsystem 528.

Thus, each of the subsystem managers 704-714 controls the operation of a respective physical subsystem 702, 704-712.

Note that the number of subsystem managers, e.g., the subsystem managers 704-714, is not material to the invention. In theory, there may be any number of subsystem managers although those skilled in the art having the benefit of this disclosure will appreciate that certain practical limitations will arise from implementation specific details. Thus, additional subsystem managers may be added to the control system structure 700 as additional physical subsystems are added. For instance, in embodiments wherein the fuel processor 402 reformate 410 is output to a PSA 415, as shown in FIG. 4, a subsystem manager (not shown) can be added to the control system structure 700 to manage the PSA 415. Note that this would then have the beneficial effect of integrating the operation of the PSA 415 with that of the fuel processor 402 that provides the reformate 410 with concomitant benefits in efficiency.

Still referring to FIG. 7, the control system structure 700 further includes additional layers that contribute to its modularity in a hierarchical fashion. More particularly, the control system structure 700 includes a hardware-dependent layer 716 and a "compatibility" layer 718. Aspects of the control functionality that are hardware-dependent are segregated into the hardware-dependent layer 716. For example, referring to FIG. 6, to alter the flow of coolant to the heat exchangers 109 of the ATR 100', the settings of the pumps 615-617 are changed. A control signal (not shown) is transmitted from the control system structure 700 to the actuator (also not shown) of the pumps 615-617, and the characteristics of this signal are hardware dependent. The functionality of actually generating and transmitting this control signal is segregated into the hardware-dependent layer 716.

Thus, if the hardware in, for example, the fuel subsystem 706 is changed out from one model to another, then only the hardware-dependent layer 716 needs to be amended. The compatibility layer 718 converts instructions issued by the subsystem managers 704-714 so that they are compatible with the hardware of the fuel processor 700. For instance, one subsystem manager 704-714 may request an event using a particular unit of measurement. The hardware needed to implement the request may take instructions in a second unit of measurement. The compatibility layer 718 will translate the instruction issued by the subsystem managers 704-714 in the first unit of measurement to the second unit of measurement employed by the hardware so it can be implemented by the hardware-dependent layer 716.

The illustrated embodiment of the control system 700 furthermore includes a diagnostic layer 720 that also contributes to its modularity in a hierarchical fashion. Each of the subsystem managers 704-714 monitors its respective physical subsystem 502, 504-512 for error conditions. More particularly, the subsystem managers 704-714 monitor for "shutdown" conditions, i.e., error conditions sufficiently important they warrant shutting down the fuel processor 402. The error conditions detected by the subsystem managers 704-714 are reported to the master control manager 702 through the diagnostic layer 720.

Each of the subsystem managers 704-714 also embodies a modular internal structure 800 conceptually illustrated in FIG. 8. Each of the subsystem managers 704-714 employs this modular internal structure 800 to conduct its business in the management of the respective physical subsystem 702, 704-712. Each of the subsystem managers 704-714 includes:
   an information exchange module 805 through which the particular subsystem manager 704-714 determines the feasibility of implementing events requested by other subsystem managers 704-714 through the master control manager 702 and identifies the actions for implementing requested events;
   a diagnostic module 810 that communicates with the diagnostic layer 720 through the information exchange module 805 to report error conditions;
   a physical module 815 with which the information exchange module 805 consults to identify the actions for implementing requested events and with which the diagnostic module communicates to obtain information regarding error conditions; and
   a control module 820 with which the physical module 815 consults to determine which actions are to be taken to implement a requested event and through which communicates with the hardware-dependent layer 716 through the compatibility layer 718 to obtain the information for such determination.

In alternative embodiments of the control system structure 700 omitting the diagnostic layer 720, the diagnostic module 810 may be omitted from the subsystem managers 704-714.

Referring to both FIG. 7 and FIG. 8, in the illustrated embodiment, the subsystem managers 704-714 cooperate with each other by communicating requests from their information exchange modules 805 through the master control manager 702. For instance, consider a situation in which the oxidizer 704 senses a drop in pressure in the feed from the fuel subsystem 706. The ATO subsystem manager 710 may request that the supply of fuel 404 increase. In the parlance of the illustrated embodiment, a fuel increase would be an "event." The ATO subsystem manager 710 issues the request through its information exchange module 805, which communicates the request to the master control manager 702. The master control manager 702 forwards the request to the appropriate physical subsystem manager—the fuel subsystem manager 704, in this case.

The fuel subsystem manager 704 receives the request via its own information exchange module 805, which checks to see if it is in the proper operational state (discussed further below) to implement the request. The fuel subsystem manager 704 then implements the requested event if it is permissible and feasible. The information exchange module 805 instructs the physical module 815 to implement the requested event. The information exchange module 805 queries the controller module 820 about which actions need to be taken. The information exchange module 805 then informs the physical module 815 of those actions that need to be taken. The physical module 815 then issues such an instruction to the hardware actuator (not shown) through the hardware dependent layer 716 via the compatibility layer 718.

The master control manager 702 also controls the operational state of the overall system 700 through the subsystem managers 704-714. Each of the subsystem managers 704-714 transitions through eight different states, although not all eight in every operational cycle:

- an "off" state;
- a "manager check" state, in which the subsystem managers 704-714 check the operational readiness of their respective physical subsystem 502-512;
- a "manual" state, in which an operator can direct operation of the overall system;
- a "preheat" state, in which the heating elements and fluids of the fuel processor 402 overall are preheated, or precooled, to their designated levels for normal operation;
- a "startup" state, in which the fuel processor 402 begins operation under start-up conditions;
- a "run" state, in which the fuel processor 402 operates under steady-state conditions;
- a "shutdown" state, in which the physical subsystems of the overall system shutdown their operation to a planned end of an operational cycle; and
- an "emergency shutdown" state, in which the physical subsystems are shut down in response to the occurrence and detection of an emergency condition in one or more of the physical subsystems.

Although each of the subsystem managers 704-714 transitions through the same eight states, the tasks assigned to each of the subsystem managers 704-714 will be unique in light of the requirements of their respective physical subsystem 502-512. For example, the tasks performed by the fuel subsystem manager 704 in the run state will differ from the tasks of the ATR subsystem manager 712 in the run state, given the differences in the operation and function of the fuel subsystem 522 and the ATR 100', both shown in FIG. 5.

Referring now to FIG. 7, an operator chooses whether to enter the manual state on powering up or initializing the system, i.e., exiting the off state. If the operator does not choose the manual state 706, the master control manager 702 assumes control. In the manual state, the operator can choose a percentage of operational capacity and the system ramps up to the setpoints of the specified level, but still applies control logic. That is, the subsystem managers 704-714 still cooperate with one another through the master control manager 700 as described above.

Assuming now that the operator does not assume manual control, the master control manager 702 sends a signal to each of the subsystem managers 704-714 to transition to the manager check state. Each of the subsystem managers 704-714 transitions to the manager check state. Each of the subsystem managers 704-714 then performs its tasks associated with the manager check state. When the individual subsystem managers 704-714 have completed their tasks associated with the manager check state, they signal that fact to the master control manager 702. The master control manager 702 waits until all the subsystem managers 704-714 have signaled they are through, and the signals the subsystem managers 704-714 to transition to the preheat state.

This procedure is repeated as the subsystem managers 704-714 transition through the remaining states. Note that the subsystem managers 704-714 transition to the next state only when signaled to do so by the master control manager 702. Note also that the master control manager 702 only signals the subsystem managers 704-714 to transition when all of the subsystem managers 704-714 are ready to do so. Thus, the subsystem managers 704-714 transition through their states in a synchronized fashion under the direction of the master control manager 702.

Thus, the master control manager 702 therefore controls the overall operation of the fuel processor 700 in two ways. First, communications between various subsystem managers are routed through the master control manager 702. Second, the master control manager 702 controls the operational states of the subsystem managers 704-714.

The operational cycle of the fuel processor 402 under the control of the control system 406, first shown in FIG. 4, will now be discussed. Returning to FIG. 5, in operation, the fuel processor 402 must first be initialized, or started-up. In general terms, the fuel processor 402 start-up involves lighting off oxidizer 514, bringing the oxidizer 514 to operating conditions lighting off the ATR 100' and then bringing the ATR 100' to operating conditions. The oxidizer 514 light off is the state of the oxidizer 514 when there is an ongoing catalysed reaction between the fuel and air in a desired temperature range. Similarly, the ATR 100' light off is the state of the ATR 100' when it is considered to have an ongoing catalysed reaction between the components of the process feed stream 520 received from the oxidizer 514. The start-up procedure will largely be implementation specific, depending on the design of the ATR 100' and the oxidizer 514 and their interrelationship.

Figure 9:
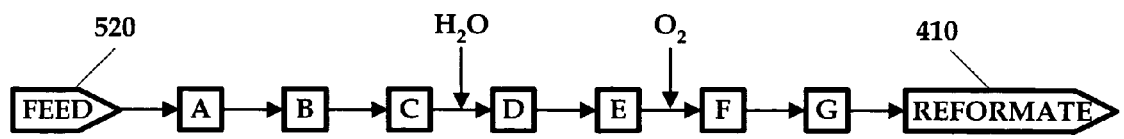
FIG. 9 depicts a general process flow diagram illustrating the process steps included in the illustrative embodiments of the present invention.

Once the fuel processor 402 is started-up, it goes into its operational cycle. The operational cycle comprises steady-state operations for the process flow 900, discussed below relative to FIG. 9, implemented by the fuel processor 402. Referring now to FIG. 5 and FIG. 9, the operation of the fuel processor 402 under the control of the automated control system 406 will now be described. On power up or reset, the fuel processor 402 and the control system 406 transition from the off state to either the manager check state or the manual state, depending on operator input. Assuming the operator does not take manual control, the master control manager 702 signals the subsystem managers 704-714 to transition to the manager check state 704, in which the subsystem managers 704-714 check the operational readiness of their respective physical subsystem. Once each of the subsystem managers 704-714 signals the master control manager 702 that their respective physical subsystem has passed the manager check, the master controller 702 signals the subsystem managers 704-714 to transition to the preheat state, in which the heating elements and fluids of the respective physical subsystems are preheated, or pre-cooled, to their designated levels for normal operation.

Once all the subsystem managers 704-714 signal that their respective physical subsystem has completed its preheat tasks, the master control manager 702 signals them to transition to the startup state, in which the fuel processor 402 begins operation under start-up conditions. As will be appreciated by those skilled in the art having the benefit of this disclosure, the fuel processor 402 cannot simply step into production. For instance, the oxidizer 704 cannot begin to mix process feed stream 520 until it has fuel 404, water 516, and air 518 to mix. Similarly, the ATR 100' cannot begin to reform the fuel 404 until it has received sufficient process feed stream 711 from the oxidizer 704. Thus, in the startup state, out-of-range pressures, volumes, etc. that do not trigger, shutdown error conditions are tolerated until the fuel processor 402 reaches steady state operations.

Once all the subsystem managers 704-714 signal that their respective physical subsystems have reached steady-state operational conditions, the master control manager 702 signals them to transition to the run state. In the run state 712, the fuel processor 402 operates under steady-state conditions. The overall function of the fuel processor 402 is to reform the fuel 404. Thus, the operation of the fuel processor 402 centers around the operation of the ATR 100' and the delivery of fuel 404, air 518, and water 516 to the ATR 100' from the fuel subsystem 522, water subsystem 524, and air subsystem 526.

FIG. 9 depicts a general process flow diagram illustrating the process steps included in the illustrative embodiments of the present invention. The following description associated with FIG. 9 is adapted from U.S. patent application Ser. No. 10/006,963, entitled "Compact Fuel Processor for Producing a Hydrogen Rich Gas," filed Dec. 5, 2001, in the name of the inventors Curtis L. Krause, et al., and published Jul. 18, 2002, (Publication No. US2002/0094310 A1). One skilled in the art should appreciate that a certain amount of progressive order is needed in the flow of the reactants trough the reactors disclosed herein. The fuel processor 402 feeds include a hydrocarbon fuel 404, oxygen, and water 516. The oxygen can be in the form of air 518, enriched air, or substantially pure oxygen. The water 516 can be introduced as a liquid or vapor. The composition percentages of the feed components are determined by the desired operating conditions, as discussed below. The fuel processor effluent stream, i.e., the reformate 410, includes hydrogen and carbon dioxide and can also include some water 516, unconverted hydrocarbons, carbon monoxide, impurities (e.g., hydrogen sulfide and ammonia) and inert components (e.g., nitrogen and argon, especially if air 518 was a component of the feed stream 520).

Process step A is an autothermal reforming process in which two reactions, a partial oxidation (formula I, below) and an optional steam reforming (formula II, below), performed in the modules 101' and 102' in FIG. 6, are combined to convert the feed stream 520 into a synthesis gas containing hydrogen and carbon monoxide. Formulas I and II are exemplary reaction formulas wherein methane is considered as the hydrocarbon:

$$CH_4 + \tfrac{1}{2}O_2 \rightarrow 2H_2 + CO \tag{I}$$

$$CH_4 + H_2O \rightarrow 2H_2 + CO \tag{II}$$

The fuel stream 520 is received by the ATR 100' from the oxidizer 514. A higher concentration of oxygen in the feed stream 520 favors partial oxidation whereas a higher concentration of water 516 vapor favors steam reforming. The ratios of oxygen to hydrocarbon and water 516 to hydrocarbon are therefore characterizing parameters that affect the operating temperature and hydrogen yield.

The operating temperature of the autothermal reforming step A in FIG. 9 can range from about 550° C. to about 900° C., depending on the feed conditions and the catalyst. The ratios, temperatures, and feed conditions are all examples of parameters controlled by the control system of the present invention. The illustrated embodiment uses a catalyst bed of a partial oxidation catalyst in module 105' with or without a steam reforming catalyst.

Returning to FIG. 9, process step B is a cooling step performed in the module 103' of FIG. 6 for cooling the synthesis gas stream from process step A to a temperature of from about 200° C. to about 600° C., preferably from about 575° C. to about 425° C., to optimize the temperature of the synthesis gas effluent for the next step. This cooling may be achieved with heat sinks, heat pipes or heat exchangers depending upon the design specifications and the need to recover/recycle the heat content of the gas stream using any suitable type of coolant 515.

Returning again to FIG. 9, process step C is a purifying step, performed in the module 103', and employs zinc oxide as a hydrogen sulfide absorbent. One of the main impurities of the hydrocarbon stream is sulfur, which is converted by the autothermal reforming step A to hydrogen sulfide. The processing core used in process step C preferably includes zinc oxide and/or other material capable of absorbing and converting hydrogen sulfide, and may include a support (e.g., monolith, extrudate, pellet, etc.). Desulfurization is accomplished by converting the hydrogen sulfide to water in accordance with the following reaction formula III:

$$H_2S + ZnO \rightarrow H_2O + ZnS \tag{III}$$

The reaction is preferably carried out at a temperature of from about 300° C. to about 500° C., and more preferably from about 375° C. to about 425° C. This temperature is also controlled by the control system of the present invention.

Referring once more to FIG. 9, the effluent stream may then be sent to a mixing step D performed in module 102', in which water 516 received from the water subsystem 524 is optionally added to the gas stream. The addition of water 516 lowers the temperature of the reactant stream as it vaporizes and supplies more water 516 for the water gas shift reaction of process step E (discussed below). The water vapor and other effluent stream components are mixed by being passed through a processing core of inert materials such as ceramic beads or other similar materials that effectively mix and/or assist in the vaporization of the water 516. Alternatively, any additional water 516 can be introduced with feed, and the mixing step can be repositioned to provide better mixing of the oxidant gas in the CO oxidation step G (discussed below). This temperature is also controlled by the control system of the present invention.

Returning to FIG. 9, process step E, performed in Module 101' is a water gas shift reaction that converts carbon monoxide to carbon dioxide in accordance with formula IV:

$$H_2O + CO \rightarrow H_2 + CO_2 \tag{IV}$$

The concentration of carbon monoxide in the final reformate should preferably be lowered to a level that can be tolerated by fuel cells, typically below 50 ppm. Generally, the water gas shift reaction can take place at temperatures of from 150° C. to 600° C. depending on the catalyst used. Under such conditions, much of the carbon monoxide in the gas stream is converted. This temperature and concentration are more parameters controlled by the control system of the present invention.

Returning again to FIG. 9, process step F, performed in module 101', is a cooling step performed in the illustrated embodiment by a heat exchanger 478. The heat exchanger 478 reduces the temperature of the gas stream to produce an effluent having a temperature preferably in the range of from about 90° C. to about 150° C. Oxygen from the air subsystem 526 is also added to the process in step F. The oxygen is consumed by the reactions of process step G described below.

Process step G, performed in module 482g, is an oxidation step wherein almost all of the remaining carbon monoxide in the effluent stream is converted to carbon dioxide. The processing is carried out in the presence of a catalyst for the oxidation of carbon monoxide. Two reactions occur in process step G: the desired oxidation of carbon monoxide (formula V) and the undesired oxidation of hydrogen (formula VI) as follows:

$$CO + \tfrac{1}{2}O_2 \rightarrow CO_2 \qquad (V)$$

$$H_2 + \tfrac{1}{2}O_2 \rightarrow H_2O \qquad (VI)$$

The preferential oxidation of carbon monoxide is favored by low temperatures. Since both reactions produce heat it may be advantageous to optionally include a cooling element such as a cooling coil disposed within the process. The operating temperature of process is preferably kept in the range of from about 90° C. to about 150° C. Process step G reduces the carbon monoxide level to preferably less than 50 ppm, which is a suitable level for use in fuel cells.

The effluent, i.e., the reformate 410, exiting the fuel processor 402 is a hydrogen rich gas containing carbon dioxide and other constituents which may be present such as water 516, inert components (e.g., nitrogen, argon), residual hydrocarbon, etc. Product gas may be used as the feed for a fuel cell or for other applications where a hydrogen rich feed stream is desired. Optionally, product gas may be sent on to further processing, for example, to remove the carbon dioxide, water 516 or other components.

Eventually, the operational cycle ends. If the end is planned, then the master control manager 702 signals the subsystem managers 704-714 to transition to the shutdown state at an appropriate time. As mentioned above, the subsystem managers 704-714 monitor, through their diagnostic module 610, shown in FIG. 6, their respective physical subsystems for the occurrence of error conditions. Some error conditions warrant shutting down operation of the fuel processor 402. If such a "shutdown" error condition is detected, the subsystem manager 504-514 detecting it reports it through the diagnostic module 610 and the diagnostic layer 520, shown in FIG. 5, to the master control manager 702. The master control module 502 then signals the subsystem managers 704-714 to transition to the emergency shutdown state 716.

Thus, the process 900 of FIG. 9, discussed above, is performed by the apparatus 400, shown in FIG. 4, under the direction of the control system 406. The control system 406 is computer-implemented on, for example, the computing apparatus 300 of FIG. 3. More particularly, the control application 303 residing on the computing apparatus 300 embodies a hierarchical control structure 700, shown in FIG. 7, to control the overall operation of the apparatus 400. The ATR subsystem manager 712 of the control structure 700 controls the operation of the ATR 100', including the implementation of the method 200 in the illustrated embodiment.

More particularly, the ATR subsystem manager 712 monitors (at 203, FIG. 2A) the saturation level of a reactor shift bed catalyst 115' in the ATR 100'. Eventually, the ATR shift bed 112' will lose its effectiveness, and will need to be generated. Consequently, the ATR subsystem manger 712 monitors (at 203, FIG. 2A) the reactor shift bed catalyst 115' for the occurrence of such a condition, i.e., a saturation state. The ATR subsystem manager 712 automatically detects (at 206, FIG. 2A) that the reactor shift bed catalyst 115' has entered a saturated state when this occurs.

There are several ways to make this determination known to the art, and any may be used. One way to determine when to regenerate monitors the reformate quality, especially the CO concentration in the reformate stream. When the CO concentration is getting unusually high (e.g., >4%), it may indicate that the shift catalyst is losing its activity, which suggests that regeneration is needed. Alternatively, if there is minimal cooling or a fixed amount of cooling in the shift bed 112', drops in reaction temperatures may indicate saturation. When the automated control system 406 determines the ATR shift bed 112' needs regeneration, it then automatically regenerates (at 209) the reactor shift bed catalyst 115'. In the illustrated embodiment, to accomplish this task, the ATR subsystem manager 712 applies the method 1000, shown in FIG. 10A-FIG. 10B.

The method 1000 begins (at 1003) by checking (at 1006) to see if the ATR 100' is at room temperature. In general, regeneration should only be initiated when the ATR 100' is at a temperature below about 50° C. Thus, most embodiments will typically employ the present invention during initialization of the ATR 100', although this is not necessary to the practice of the invention. If not, the automated control system 406 waits (at 1009) until it is. When the ATR 100' reaches room temperature (at 1012), the automated control system 406 sets (at 1015) the temperature setpoint to a "safety shutdown temperature." The safety shutdown temperature setpoint for the illustrated embodiment is 500° C., which is higher value than the shift catalyst operating temperature that is normally 300° C.-350° C.

The method 1000 then checks (at 1018) to make sure cooling water to the shift catalyst bed is shut off. If not, then the cooling water is turned off (at 1021). If the cooling water is turned off, the method 1000 prepares (at 1024) the ZnO bed and the preferential oxidizer ("POX") for the shift bed regeneration. The regeneration process involves flowing air (without fuel) through the entire ATR 100' reactor. The air flow passes through the POX, reforming, and ZnO sections prior to entering shift catalyst bed section. Accordingly, the method 1000 controls the non-shift sections so that they will not be overheated and the catalyst damaged. The method 1000 therefore prepares (at 1024) the ZnO bed and the preferential oxidizer by turning on the ZnO cooling water, starts the ZnO temperature controller with a set point at 500° C. This will avoid the ZnO high temperature shutdown at 600° C. limit.

The method 1000 then proceeds to purge (at 1027) the ATR 100' with air. In the illustrated embodiment, air flow to the ATR reactor is turned on at 45 Lpm for a duration of at least 3 minutes to achieve a reactor purge of four reactor volumes before proceeding. The method 1000 then heats (at 1030) the preferential oxidizer by turning on the heater at a set point at 550° C. The method 1000 then heats the shift bed (at 1033) by turning on the shift heaters at a set point at 300° C.

The method 1000 then monitors (at 1036) the temperature in the ATR 100'. It monitors the temperature profile for an expected exothermic temperature profile of ~150° C. in the shift section due to oxidation of catalyst. The method 1000 also actively manages (at 1039) the regeneration parameters. If coking or soot deposits occurred in the preferential oxidizer or reforming catalyst sections during normal operation, then additional temperature increases may be experienced locally and potentially in the shift bed sections due to the exothermic oxidation of the coke or soot. If the ATR temperature increases above 700° C., the controls decrease air flow to 20~30 Lpm to avoid ATR high temperature shutdown at 900° C. Should the ATR temperature nevertheless exceed (at 1042) high temperature shutdown limits, then the method 100 shuts down (at 1045) the ATR 100'.

The method 1000 continues actively managing (at 1039) the regeneration parameters until the regeneration is complete (at 1048). More particularly, in the illustrated embodiment, the method 1000 automatically performs the above-described checks for at least 4 hours or until air concentration is established on outlet which completes the regeneration procedure. When regeneration is complete (at 1048), the method 1000 resets (at 1051) the unit status and prepares it for the next normal operation by resetting the shift bed shut down temperatures to 350° C. and then performing shutdown (at 1045) of the unit. The method 1000 then ends (at 1054).

The method 1000 is performed periodically during the operational cycle when the shift catalyst bed reaches a saturation state. When the operational cycle ends, the fuel processor 402 is shutdown. The shutdown may be planned, as in the case for maintenance, or unplanned, as when a shutdown error condition occurs. The oxidizer 514 and ATR 100', respectively, are, in general terms, purged and cooled. On transition to the shutdown state, the air subsystem 526, the water subsystem 524, and the thermal subsystem 528 are providing air 518, water 516, and thermal control to the oxidizer 514 and the ATR 100'. As with the start-up, the shutdown procedure will largely be implementation specific, depending on the design of the ATR 100' and the oxidizer 514 and their inter-relationship. In the illustrated embodiment, the ATR 100' is first purged and shutdown, followed by the oxidizer 514 purge and shutdown.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A computing system, comprising:
   a computing device;
   a bus system;
   a storage communicating with the computing device over the bus system;
   an application residing on the storage that, when invoked, performs a programmed method comprising:
   monitoring a saturation level of a reactor shift bed catalyst in a reformer, which comprises a reformer shift bed;
   automatically detecting that the reactor shift bed catalyst has entered a saturated sate; and
   automatically regenerating the reactor shift bed catalyst in response to automatically detecting the saturated state.

2. The computing system of claim 1, wherein monitoring the saturation level includes at least one of monitoring temperatures within the reformer shift bed and monitoring the composition of the output from the reformer shift bed.

3. The computing system of claim 1, wherein automatically regenerating the reactor shift bed catalyst in the programmed method includes:
   preparing the reformer for the automatic regeneration;
   purging the prepared reformer;
   heating a shift bed of the purged reformer;
   heating a preferential oxidizer of the purged reformer;
   actively controlling parameters of the regeneration; and
   resetting the reformer upon completing the regeneration.

4. The computing system of claim 3 wherein preparing the reformer in the programmed method includes controlling the non-shift sections of the reformer so that they will not overheat and damage the catalyst.

5. The computing system of claim 3, wherein preparing the reformer in the programmed method includes at least one of:
   turning off coolant to the reactor shift bed catalyst;
   preparing a Zinc Oxide section; and
   preparing a preferential oxidizer.

6. The computing system of claim 3, wherein purging the reformer in the programmed method includes at least one of purging the reformer for a duration of at least three minutes and purging the reforming for four reactor volumes.

7. The computing system of claim 3 wherein actively controlling the parameters of the regeneration in the programmed method includes:
   monitoring the temperature of the profile; and
   controlling temperatures in the reformer to maintain an exothermic temperature profile.

* * * * *